US012719393B2

(12) United States Patent
Grall et al.

(10) Patent No.: US 12,719,393 B2
(45) Date of Patent: Aug. 25, 2026

(54) AUTOMATIC VOLTAGE REGULATOR FOR A GENERATOR

(71) Applicant: Discovery Energy, LLC, Kohler, WI (US)

(72) Inventors: Erwan Grall, Brest (FR); Christophe Hugot, Landerneau (FR); Patrice Mallejac, Plouvien (FR); Hadrien Pinault, Brest (FR)

(73) Assignee: Discovery Energy, LLC, Kohler, WI (US)

( * ) Notice: Subject to any disclaimer, the term of this patent is extended or adjusted under 35 U.S.C. 154(b) by 0 days.

(21) Appl. No.: 18/985,283

(22) Filed: Dec. 18, 2024

(65) Prior Publication Data

US 2025/0211144 A1 Jun. 26, 2025

Related U.S. Application Data

(60) Provisional application No. 63/613,251, filed on Dec. 21, 2023.

(51) Int. Cl.

*H02P 9/30* (2006.01)
*H02P 9/02* (2006.01)
*H02P 101/25* (2016.01)

(52) U.S. Cl.

CPC ................ *H02P 9/305* (2013.01); *H02P 9/02* (2013.01); *H02P 2101/25* (2015.01)

(58) Field of Classification Search

CPC ......... H02P 9/305; H02P 9/02; H02P 2101/25
See application file for complete search history.

(56) References Cited

U.S. PATENT DOCUMENTS 3,465,235 A * 9/1969 Schleif et al. .......... H02P 9/105 322/32
4,777,425 A 10/1988 MacFarlane
2009/0153105 A1* 6/2009 Czajkowski ............. H02P 9/32 322/28

(Continued)

FOREIGN PATENT DOCUMENTS

EP 2751924 B1 1/2020
EP 4148974 A1 3/2023
FR 2979765 A1 3/2013

OTHER PUBLICATIONS

Vincenzutti et al., The Role of Voltage Controls in Modern All-Electric Ships, IEEE Electrification Magazine, Jun. 2015, pp. 49-65.

(Continued)

*Primary Examiner* — Sean Gugger
(74) *Attorney, Agent, or Firm* — The Belles Group, P.C.

(57) ABSTRACT

A voltage regulator for an engine powered generator having a sampling system to sample an operating frequency of an alternating current at an electrical output of the generator. A detection system is configured to monitor the operating frequency of the generator. An excitation system is configured to alter either an excitation voltage or an excitation current of a field winding of an alternator of the engine when the operating frequency of the generator indicates a load impact at the electrical output of the generator. The excitation system then controls the excitation voltage or the excitation current as necessary to minimize the variation in the operating frequency in response to the load impact.

19 Claims, 17 Drawing Sheets

(56) References Cited

U.S. PATENT DOCUMENTS

| | | | | |
|---|---|---|---|---|
| 2015/0326161 | A1* | 11/2015 | Rodriguez | H02P 9/14 322/19 |
| 2017/0170761 | A1* | 6/2017 | Blackwelder | H02P 6/20 |
| 2022/0360202 | A1 | 11/2022 | Wang | |

OTHER PUBLICATIONS

Examiner Mohamad Koteich, Extended European Search Report, European Application EP 24218778, Completion May 8, 2025, 12 pp.

* cited by examiner

Reaction time vs. Sample time

| | Sample time [ms] | Reaction time [ms] | Frequency value at reaction time [Hz] | Frequency value at reaction time [pu] | |
|---|---|---|---|---|---|
| Too slow | 30 | 150 | 47.83 | 0.956 | |
| | 20 | 120 | 48.79 | 0.976 | |
| | 10 | 80 | 49.20 | 0.984 | Significant gain |
| | 5 | 55 | 49.40 | 0.988 | |
| | 2 | 34 | 49.68 | 0.994 | |
| optimal | 1 | 27 | 49.78 | 0.995 | No significant gain |
| | 0.5 | 27 | 49.77 | 0.995 | |

FIG. 11

AUTOMATIC VOLTAGE REGULATOR FOR A GENERATOR

CROSS-REFERENCE TO RELATED APPLICATION(S)

The present application claims the benefit of U.S. Provisional Patent Application No. 63/613,251, filed Dec. 21, 2024, which is incorporated herein by reference in its entirety.

BACKGROUND

The present invention generally relates to internal combustion engine powered generators, and more particularly to automatic voltage regulators for such generators.

Generators powered by internal combustion engines utilize active voltage regulators to control an excitation voltage of an alternator, in turn affecting the voltage and frequency of the electrical output and the speed of the engine. In many implementations, automatic voltage regulators are configured only to implement basic control strategies, unable to rapidly respond to changes in electrical load. These automatic voltage regulators suffer from poor frequency and voltage control, unduly wide swings in frequency and voltage, and long response times before stability is achieved.

Improvements are desired to minimize frequency and voltage variations of the electrical output, improve the stability of the electrical output, and shorten the response times to changes in electrical loads to a minimum.

SUMMARY

The present application discloses an engine powered generator having an internal combustion engine, an alternator, and a voltage regulator. The internal combustion engine has a crankshaft. The alternator has a rotor operably coupled to the crankshaft. The alternator is configured to deliver electrical power at an electrical output. The voltage regulator is configured to regulate an excitation voltage applied to a field winding of the alternator. The voltage regulator has a sampling system, a detection system, and an excitation system. The sampling system samples an operating frequency of an alternating current at the electrical output. The detection system is configured to compute a second derivative of the operating frequency. The excitation system is configured to alter one of the excitation voltage or an excitation current in response to the second derivative of the operating frequency indicating a load impact.

The present application also discloses a method of operating a generator. In step a), an engine of the generator is operated at an operating frequency. In step b), the operating frequency is sampled and a second derivative of the operating frequency is computed. In step c), a load impact is detected when the second derivative of the operating frequency has a magnitude or a slope exceeding a threshold. In step d), an excitation current or an excitation voltage of an alternator of the generator is altered in response to the detected load impact.

The present application also discloses a method of operating a generator. In step a), an engine of the generator is operated at an operating frequency. In step b), the operating frequency is sampled to detect a load impact. In step c), a magnitude of the load impact is computed using, at least in part, the operating frequency, an inertia of a rotating assembly of the generator, and a rated power output of the generator. In step d), an excitation voltage or an excitation current of an alternator of the generator is altered in response to the magnitude of the load impact.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which:

FIG. 11 is a table illustrating reaction times versus sample times for a 50% load impact;

Figure 1:
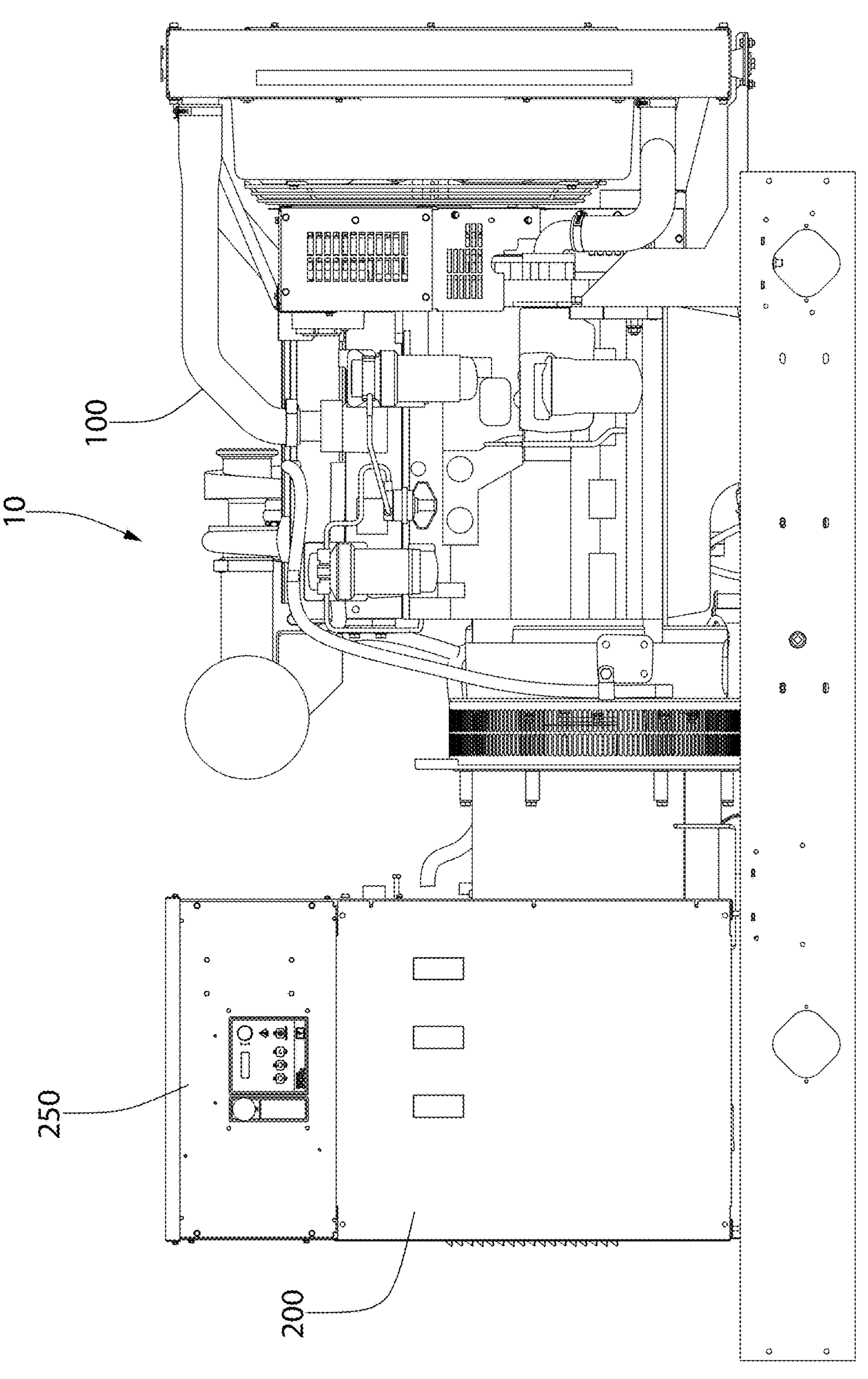
FIG. 1 is a side view of a generator according to the present disclosure.

All drawings are schematic and not necessarily to scale. Features shown numbered in certain figures which may appear un-numbered in other figures are the same features unless noted otherwise herein.

DETAILED DESCRIPTION

The features and benefits of the invention are illustrated and described herein by reference to non-limiting examples in which aspects of the disclosure may be embodied. This description of examples is intended to be read in connection with the accompanying drawings or photos, which are to be considered part of the entire written description. Accordingly, the disclosure expressly should not be limited to such examples illustrating some possible non-limiting combination of features that may exist alone or in other combinations of features disclosed herein.

In the description of examples disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

Figure 2:
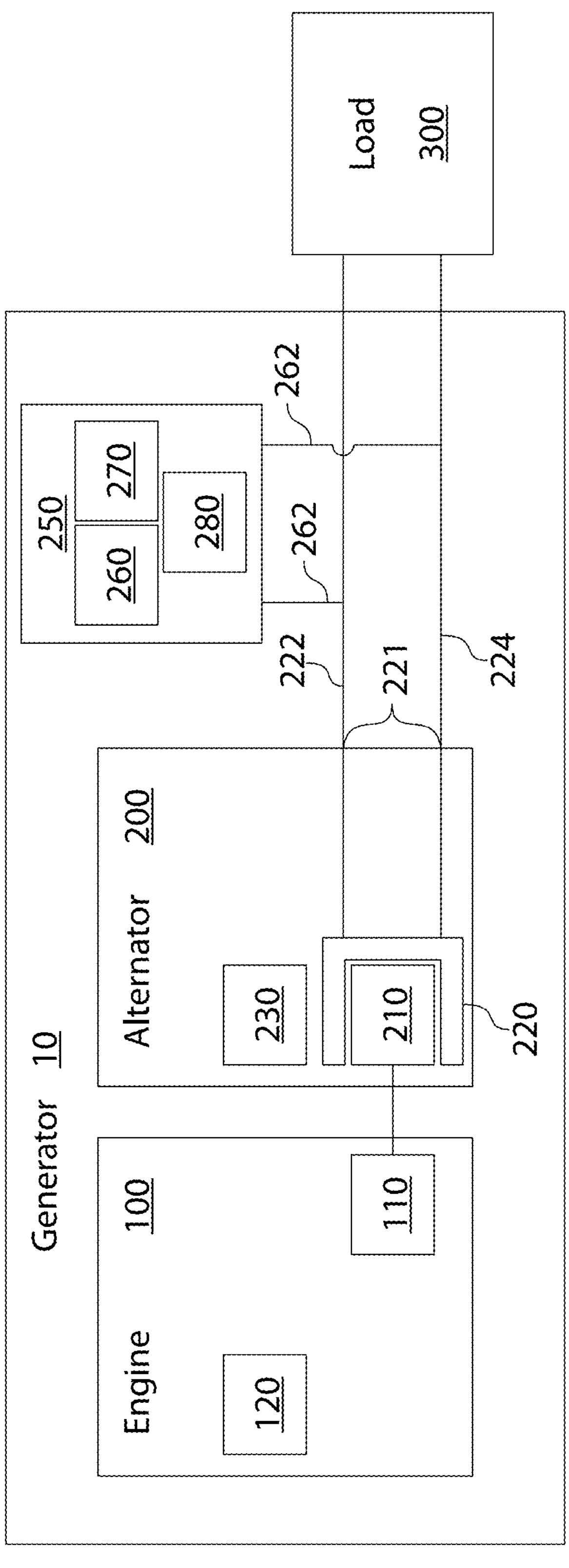
FIG. 2 is a schematic illustration of the generator.

FIG. 1 shows a side view of an internal combustion engine powered generator 10. FIG. 2 is a schematic view of the generator 10. The generator 10 has an engine 100 and an alternator 200. The engine 100 may be an internal combustion engine such as a compression-ignition engine operating on diesel fuel or a spark-ignition engine operating on a fuel such as natural gas, propane, gasoline, or any other internal combustion fuel. The engine 100 has a crankshaft 110 which transmits mechanical power to the alternator 200, the crankshaft 110 forming a portion of a rotating assembly. The engine 100 is operated by an engine controller 120, the engine controller 120 controlling parameters such as a rate of fuel flow, spark timing, throttle opening, and other parameters which may be controlled to deliver the required mechanical power via the crankshaft 110.

The alternator 200 may be configured to generate alternating current to supply one or more electrical loads at an electrical output 221, the electrical output 221 including at least one hot output 222 and at least one neutral 224. In some configurations, the alternator 200 may be configured to have a plurality of hot outputs 222 to deliver multi-phase power from the electrical output 221. In these configurations, the neutral 224 may be omitted in certain configurations (i.e. in a delta configuration). In other configurations, the alternator 200 may be configured to have one or two hot outputs 222 to deliver single-phase power from the electrical output 221. The alternator 200 may be operated at an operating frequency that may vary depending on the type of load connected to the alternator 200. For example, the alternator 200 may be operated to mimic grid power at a variety of different frequencies and voltages.

In one implementation, the alternator 200 may be configured to deliver alternating current with nominal voltages of 120 volts and 240 volts in a single-phase configuration at a target frequency of 60 Hz. In other implementations, the alternator 200 may be configured to deliver alternating current at nominal voltages of 208 volts, 240 volts, or 480 volts in a three-phase configuration at a target frequency of 60 Hz. In yet other implementations, the alternator 200 may be configured to deliver alternating current at nominal voltages of 220 volts, 240 volts, 380 volts, or 415 volts in a three-phase configuration at a target frequency of 60 Hz.

The alternator 200 has a rotor 210 operably coupled to the crankshaft 110, the rotor 210 preferably directly coupled to the crankshaft 110 so that the rotor 210 rotates once for each rotation of the crankshaft 110. However, in other implementations, the rotor 210 may be coupled to the crankshaft 110 to allow a speed increase or speed reduction of the rotor 210 with respect to the crankshaft 110. This may be done via a variety of known speed reduction techniques. In further implementations, a clutch may be incorporated between the crankshaft 110 and the rotor 210. The rotor 210, in combination with the crankshaft 110 and other rotating components, form the rotating assembly.

The rotor 210 rotates relative to a stator 220 to generate electrical power which is delivered via the electrical output 221 to one or more loads 300. The rotor 210 incorporates a field winding, the field winding generating a magnetic field which induces current in a stator winding in the stator 220. In alternate implementations, the stator winding may be substituted for a winding on the rotor 210, such that the field winding is located on the stator 220 and the winding on the rotor 210 supplies power to the electrical output 221. In other words, the field winding may be located on the stator 220 and a power-delivery winding may be located on the rotor 210. The invention is not intended to be limited to a specific arrangement of the alternator 200, and may be applied to any alternator 200 incorporating a field winding regardless of whether the field winding is located on the rotor 210 or stator 220. Indeed, other configurations are contemplated for the alternator 200 so long as the power output of the alternator 200 may be controlled by regulating current or voltage. Optionally, the alternator 200 may have a controller 230, the controller 230 used to control internal functions of the alternator 200 such as diagnostics, reporting, monitoring, and other features.

The generator 10 further has a voltage regulator 250. In some implementations, the voltage regulator 250 may be incorporated into the controller 230 or the voltage regulator 250 may form a part of the alternator 200 and may be additional to the controller 230. In other implementations, the controller 230 may be omitted and the voltage regulator 250 may be a separate component externally located from the alternator 200. In yet other implementations, the voltage regulator 250 and the controller 230 may be separate components, with the voltage regulator 250 external to the alternator 200 or internal to the alternator 200. As can be seen, the exact arrangement of the voltage regulator 250 may be varied with respect to the alternator 200. For the sake of discussion, the voltage regulator 250 has been illustrated as a separate component from the alternator 200.

The voltage regulator 250 has a sampling system 260, a detection system 270, and an excitation system 280. The sampling system 260 utilizes sensing connections 262 to sample an operating frequency of the alternating current at the electrical output 221. The sensing connections 262 may be electrical connections to each of the hot outputs 222 and neutral 224 to enable sensing of the frequency of the alternating current at the electrical output 221. In other implementations, the sensing connections 262 may be exclusively coupled to the hot outputs 222 or only a portion of the hot outputs 222 and/or the neutral 224. The sampling system 260 has circuitry which is able to sample the operating frequency of the alternator 200 via the alternating current at the electrical output 221. The sampling system 260 may incorporate voltage sensors, current sensors, or other devices suitable for monitoring the frequency of the electrical output 221. In other implementations, the sampling system 260 may utilize encoders or other devices and may monitor a frequency of the rotor 210 directly, rather than monitoring the electrical output 221. The sampling system 260 may be implemented using analog or digital circuitry, or a combination of the two. It is contemplated that a processor and a memory may be used to implement the functionality of the sampling system 260, in combination with various sensing circuits.

The detection system 270 is configured to utilize sampled data from the sampling system 260 and perform computations such as first and second derivatives of the operating frequency sampled by the sampling system 260. The detection system 270 may also detect the existence of load impacts at the electrical output 221 by performing comparisons and other calculations using data stored in memory or obtained from other sources such as communications buses including USB, WiFi, Bluetooth, and the like. The functionality of the detection system 270 will be discussed in greater detail below.

The excitation system 280 is configured to alter either an excitation voltage or an excitation current in the field windings. While the voltage regulator 250 primarily regulates the excitation voltage of the field windings in a voltage control mode, the voltage regulator 250 may also operate in a current control mode where the current in the field windings is controlled rather than the voltage. The current control mode can alter the excitation current in the field windings more rapidly, allowing more rapid changes in power output at the electrical outputs 221 than exclusively using a voltage control mode for the field windings. The excitation system 280 operates in response to determinations made by the detection system 270, implementing changes in the excitation current or excitation voltage to achieve the required control of the electrical output 221.

Figure 3:
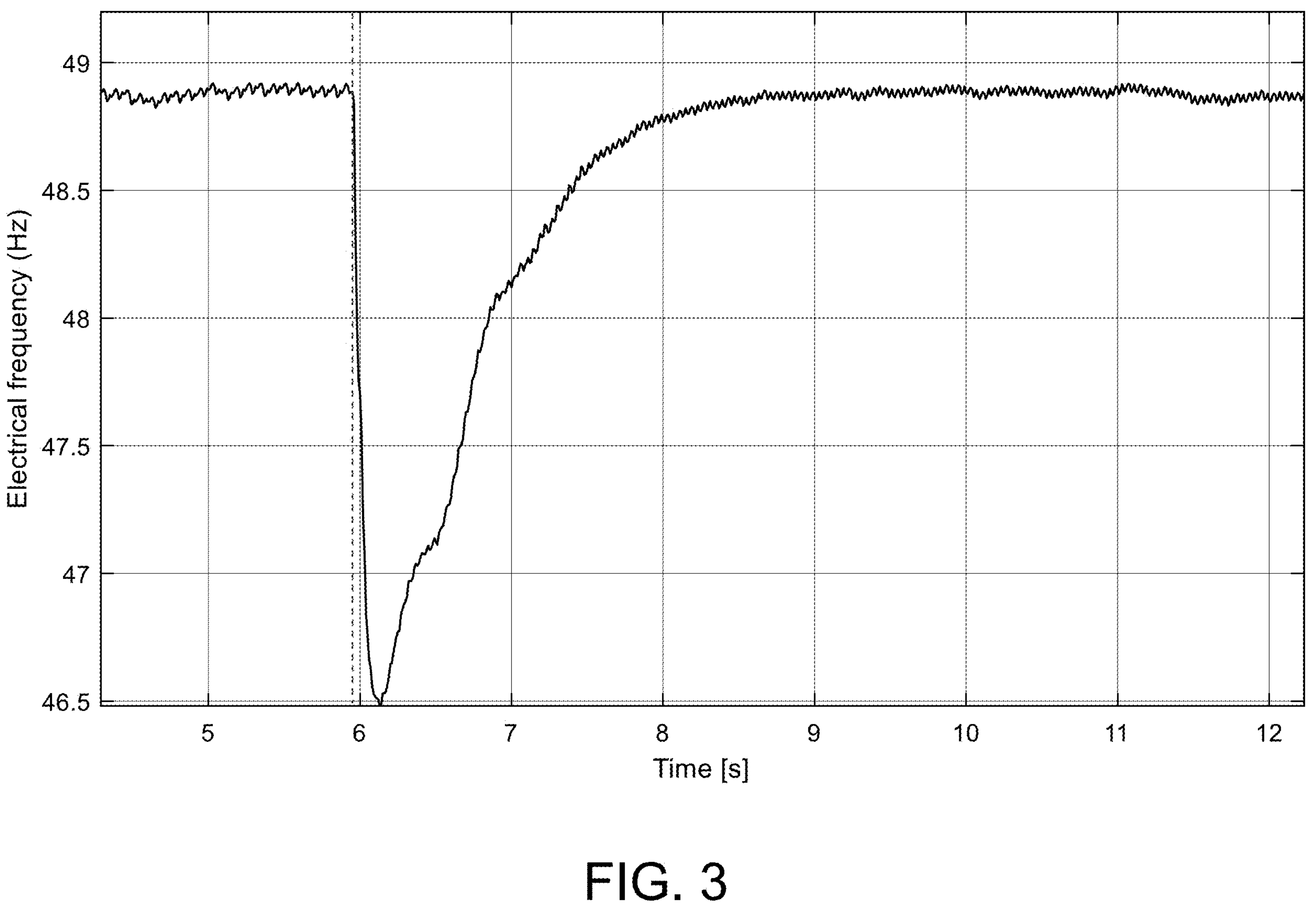
FIG. 3 is a graph of the operating frequency of the generator during a load impact equal to 50% of the rated load.

Turning to FIG. 3, a graph of the operating frequency of the generator 10 is shown. During the time period displayed in the graph, a load impact has occurred. As can be seen, the operating frequency of the generator is driven to an operating frequency of approximately 48.9 Hz, with a load impact occurring at approximately 6 seconds. During the load impact, the operating frequency drops to approximately 46.5 Hz. The load impact from one or more loads 300 causes the frequency and the voltage at the electrical output 221 to drop. In turn, the increased electrical load from the loads 300 cause the rotating assembly to slow down. As noted above, the rotating assembly includes the rotor 210 and the crankshaft 110. The graph represents a baseline response to the load impact which can be improved using superior control techniques described in greater detail below. The graph represents a load impact of 50% of the rated electrical load of the generator 10. A first generator, referred to as Generator A, was used for the test.

Figure 5:
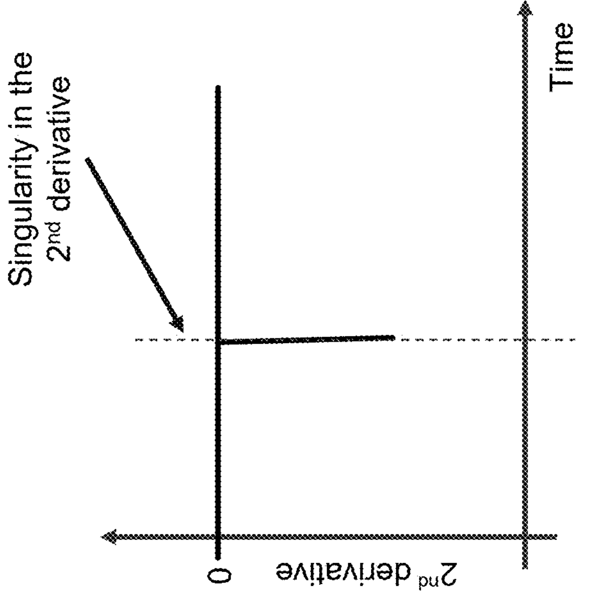
FIG. 5 is a simplified graph illustrating the second derivative of the operating frequency.
Figure 4:
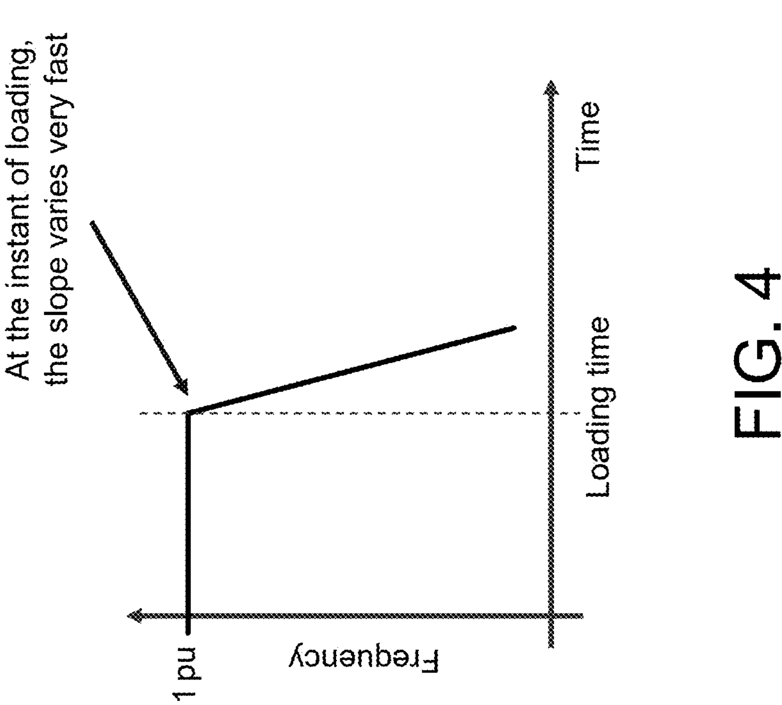
FIG. 4 is a simplified graph illustrating the operating frequency during the load impact.

FIGS. 4 and 5 illustrate simplified graphs of the operating frequency and the second derivative of the operating frequency, drawn using only straight lines for clarity. As can be seen in FIG. 4, the frequency is steady at the target frequency, which has been normalized to show 1 pu ("per unit") as the target frequency and any deviation from the target frequency being greater than or less than 1. Otherwise stated, 1 pu is 100% of the target frequency. As can be seen, the operating frequency substantially matches the target frequency until the loading time, or the time at which the load impact occurs. Immediately subsequent to the loading time, the operating frequency drops sharply, with a clear change of slope of the operating frequency at the loading time. As illustrated in FIG. 5, the second derivative of the operating frequency illustrates a singularity where the value sharply drops from zero. The amplitude or magnitude of the second derivative indicates the existence of the load impact at the loading time. Alternately, the slope of the second derivative may indicate the existence of the load impact at the loading time.

Figure 6:
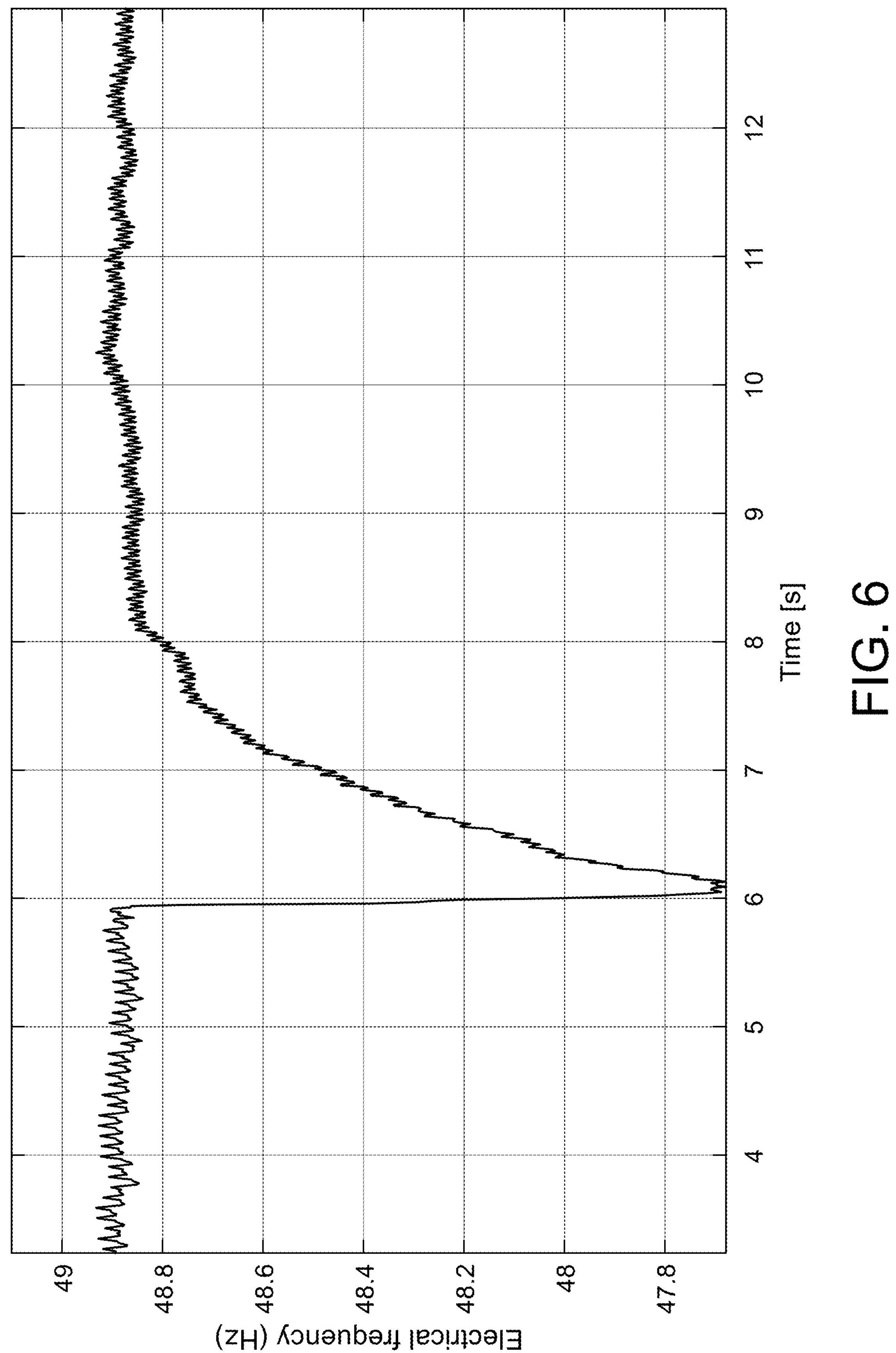
FIG. 6 is a graph of the operating frequency of the generator during a load impact equal to 25% of the rated load.

FIG. 6 illustrates the response of the same generator 10 as used in FIG. 4 when subjected to a load impact of 25% of the rated load. While the operating frequency is initially approximately 48.9 Hz, it drops to 47.7 Hz and recovers back to approximately 48.9 Hz. As can be further observed, the minimum frequency for a 25% load impact is greater than the minimum frequency for a 50% load impact. In addition, the slope of the operating frequency is less for the 25% load impact than the 50% load impact.

Figure 8:
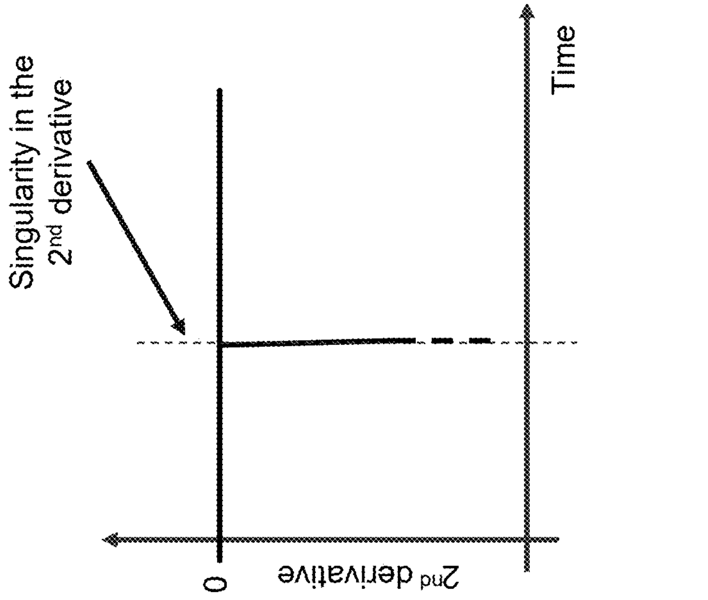
FIG. 8 is a simplified graph illustrating the second derivative of the operating frequency.
Figure 7:
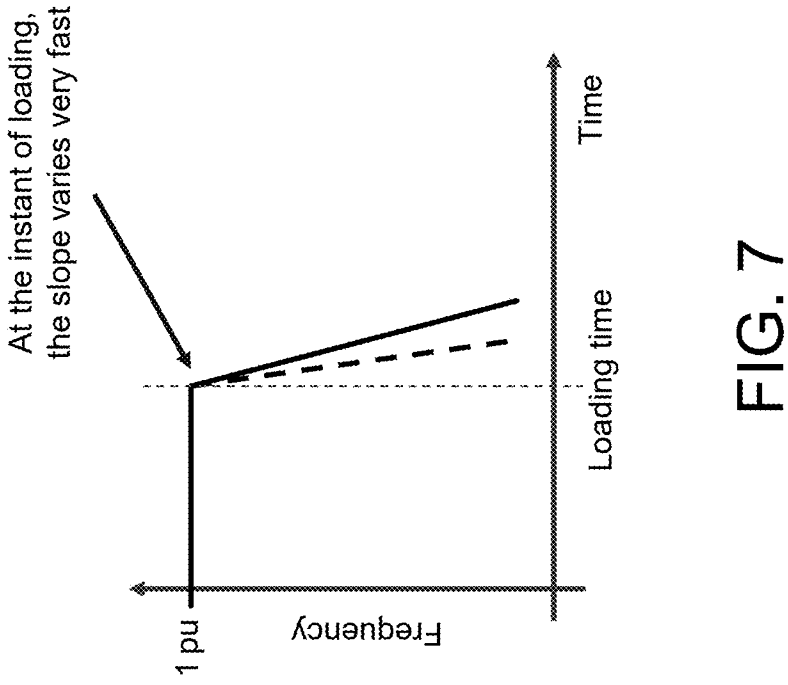
FIG. 7 is a simplified graph illustrating the operating frequency during the two load impacts.

Turning to FIGS. 7 and 8, simplified graphs of the operating frequency and the second derivative of the operating frequency are illustrated, showing both the 25% and 50% load impacts. The 25% load impact is illustrated with the solid lines, while the 50% load impact is illustrated with the dotted lines. The 25% load impact has a total drop of 1.22 Hz in 0.18 seconds, resulting in a slope of −6.78 Hz/s. The 50% load impact has a total drop of 2.44 Hz drop in 0.22 seconds, resulting in a slope of −11.07 Hz/s. Thus, increasing the load impact increases the magnitude of the slope, decreases the minimum frequency, and increases the time to achieve the minimum frequency.

Figure 9:
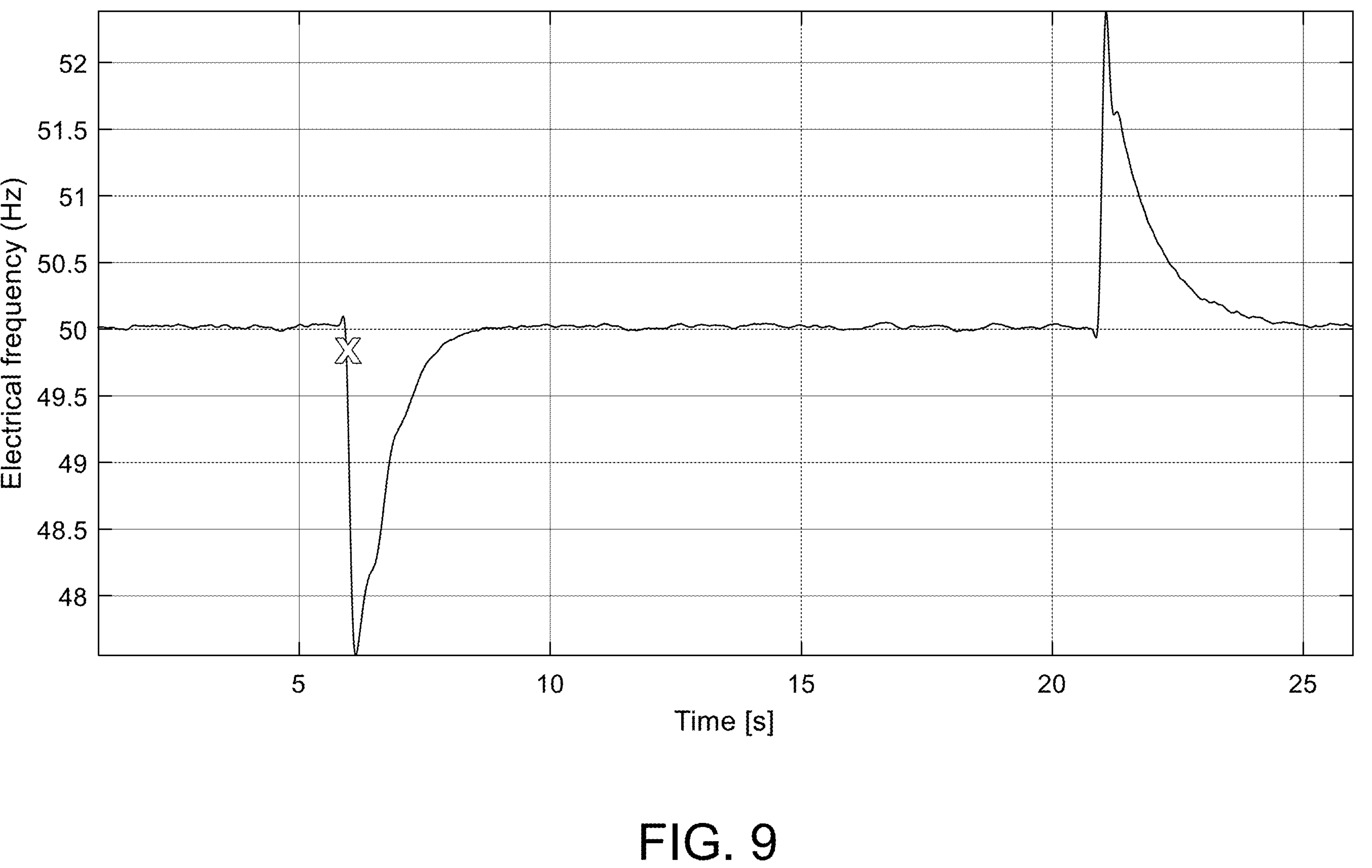
FIG. 9 is a graph of the operating frequency illustrating detection of the load impact.
Figure 10:
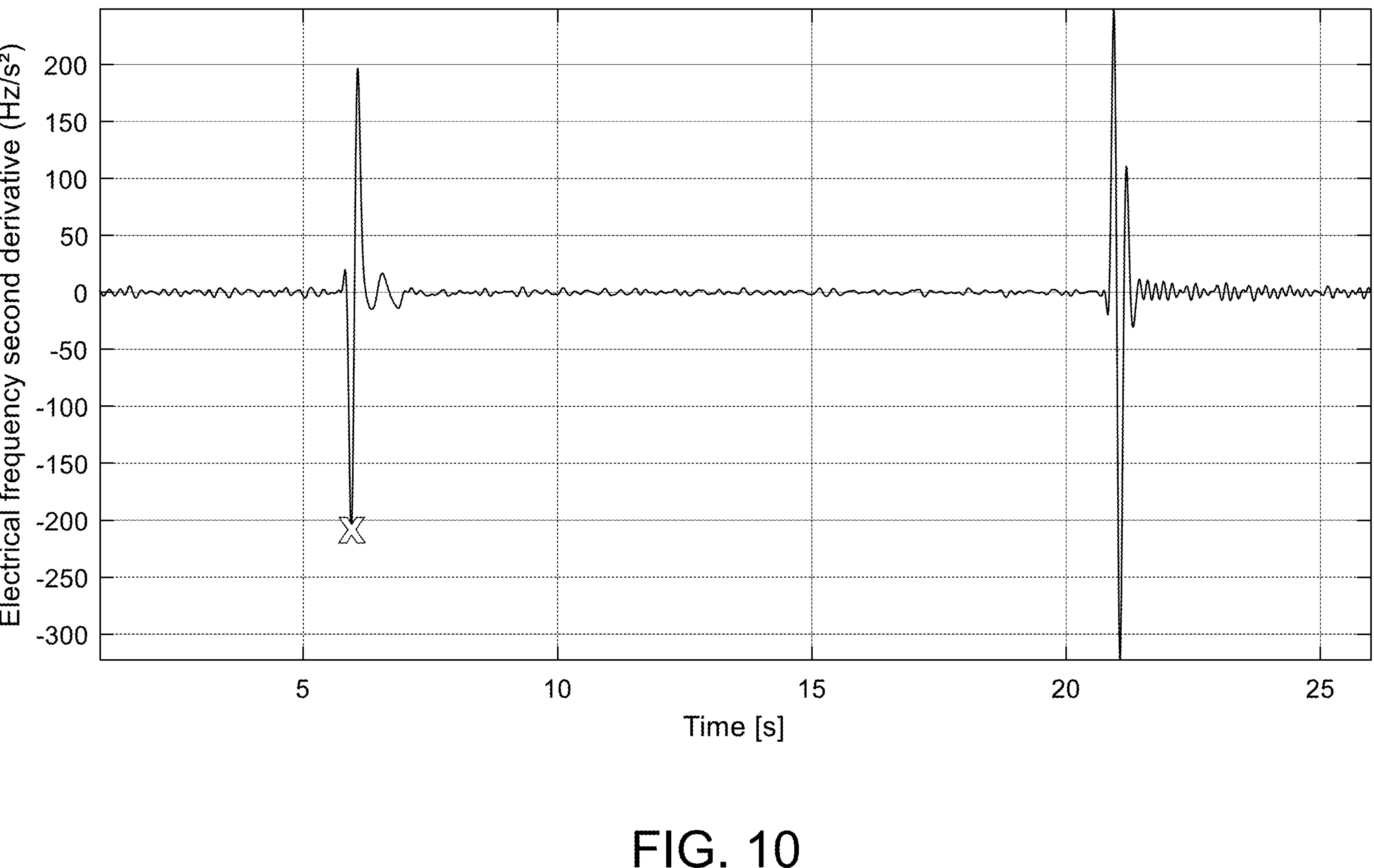
FIG. 10 is a graph of the second derivative of the operating frequency illustrating detection of the load impact.

FIG. 9 illustrates the same load impact as FIG. 3, using the same generator 10 as for FIG. 3. However, the data has been filtered with a low pass filter having a 1 Hz cutoff frequency and 60 dB attenuation. The load impact is 50% of the rated load, and the X indicates the point at which the impact is detected using the algorithm described below. FIG. 10 illustrates the filtered second derivative of the operating frequency, once again showing the X at the maximum negative slope of the second derivative of the operating frequency to indicate the time at which the load impact is detected. The X also approximately corresponds with the maximum negative magnitude of the second derivative of the operating frequency.

The maximum slope or maximum magnitude (in absolute terms) of the second derivative of the operating frequency may be used as a trigger indicating a load impact. In other implementations, a threshold may be used as the trigger to indicate the load impact, with the maximum slope or maximum magnitude exceeding a threshold being used as the trigger. In yet other implementations, a hybrid approach may be utilized where the magnitude or slope must deviate by a given amount before triggering a load impact to minimize the impacts of noise. This may be done in addition to the low pass filter discussed above. Thus, it is contemplated that the magnitude or slope may be continuously monitored, with local maximum magnitudes or slopes arising from steady state operation of the generator being excluded, and only those maximum magnitudes or slopes arising from load impacts being used as triggers to indicate the load impact. This is possible because the magnitude and slope of the load impact are distinct from steady state variations in the second derivative of the operating frequency as illustrated in FIG. 10. Traditional thresholds may be used to aid in distinguishing load impacts from steady state variations, or other methods such as learning algorithms, fuzzy logic, and the like, may be implemented. It is even contemplated that a history may be recorded and used as a basis for comparison.

FIG. 11 illustrates a table of reaction times versus sampling time. The sampling system 250 may be operated at a variety of sampling frequencies to sample the operating frequency of the electrical output 221. Sampling times of 30 milliseconds ("ms"), 20 ms, 10 ms, 5 ms, 2 ms, 1 ms, and 0.5 ms were used. The reaction time in milliseconds was recorded as being the delay between when the load impact occurred and when it was detected by the detection system 270. Furthermore, the frequency value at the reaction time and the normalized frequency value expressed as per unit of the target frequency are also listed in the table. As can be seen, the optimal sampling time is 1 ms. 0.5 ms offers substantially the same reaction time and frequency value at the reaction time, but the additional sampling load offers no appreciable benefit. Thus, while 0.5 ms achieves substantially the same results, 1 ms achieves optimal results while minimizing the sample rate to minimize the processing requirements. In every step from 30 ms to 1 ms, the reaction time improved, but each step increases the processing requirements of the system. Thus, in some implementations, sampling times of 20, 10, 5, 2, 1, or 0.5 ms may be utilized.

Figure 12:
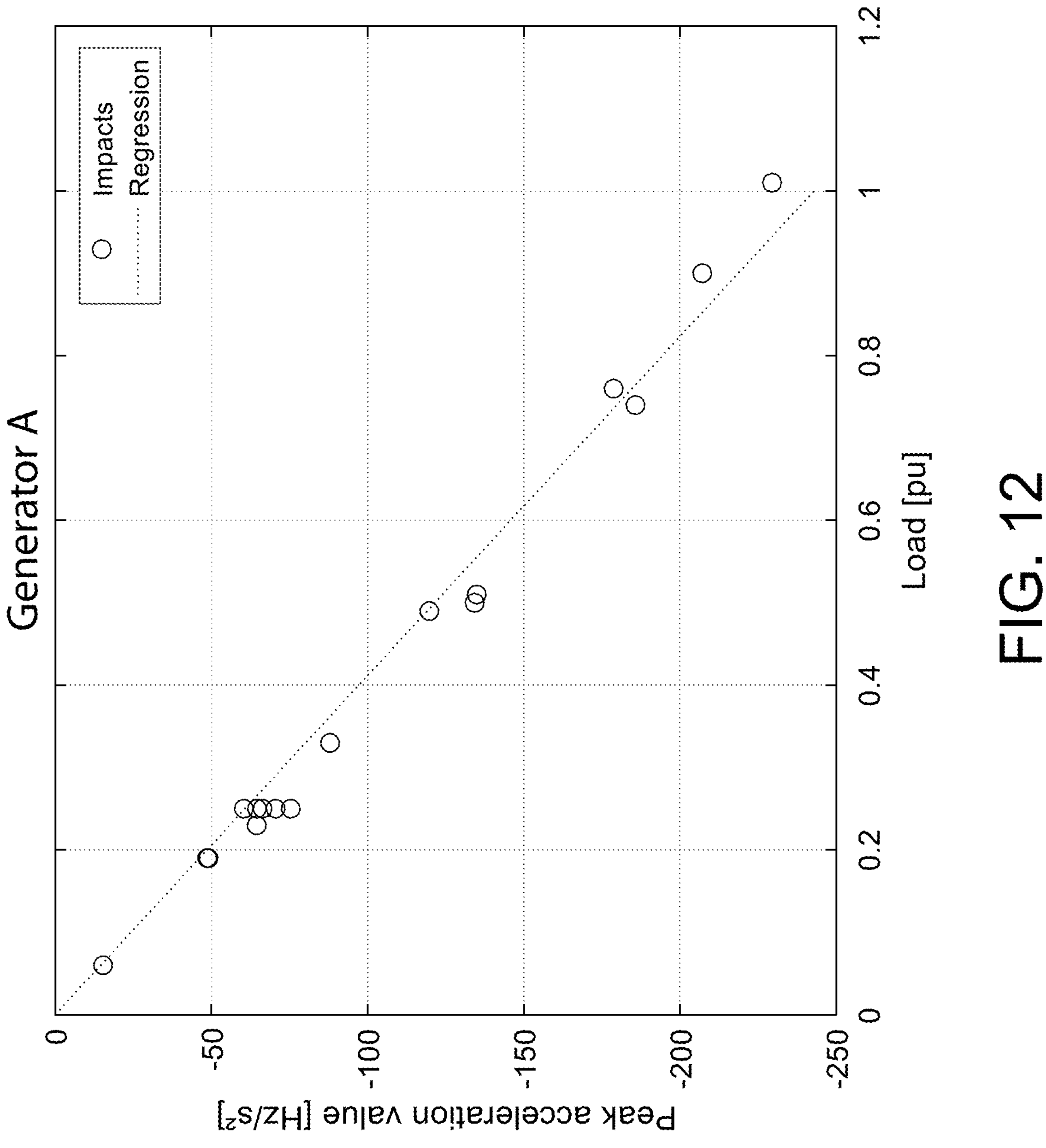
FIG. 12 is a graph illustrating a relationship between peak acceleration and normalized load impact for a first model of the generator.

FIG. 12 illustrates the peak acceleration value plotted with respect to the load impact on a per unit basis, with 1 pu equal to the rated electrical output of the generator. Numerous load impacts of differing size are plotted. Once again, this test was performed on generator A. As can be seen, the load impact and peak acceleration value of the operating frequency (in other words, the second derivative of the operating frequency) follow a substantially linear relationship. The minimum value of the second derivative of the operating value can be related very closely to the size of the load impact, allowing prediction of the size of the load impact based solely on the second derivative of the operating frequency.

Figure 13:
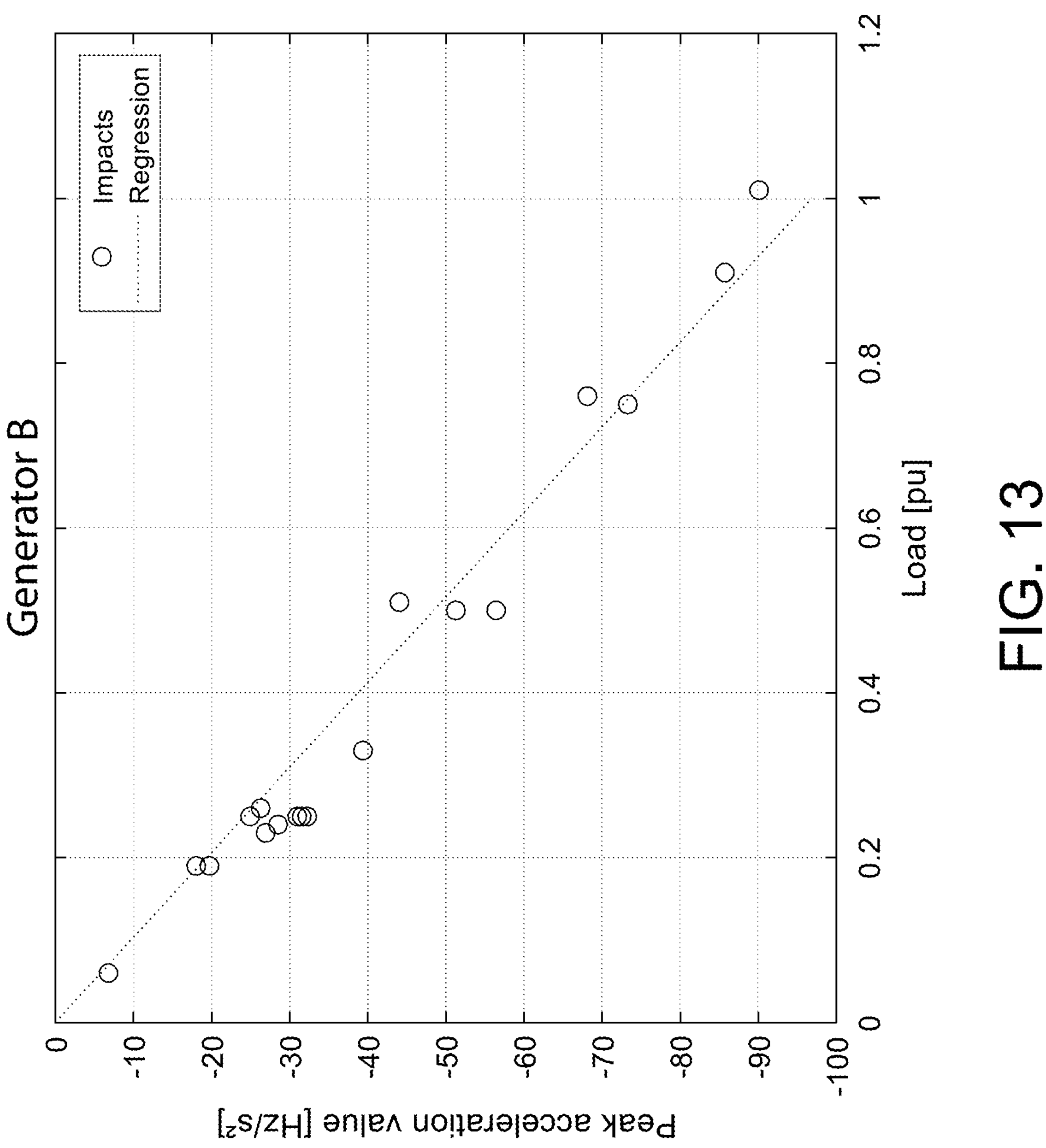
FIG. 13 is a graph illustrating a relationship between peak acceleration and normalized load impact for a second model of the generator.

FIG. 13 illustrates the peak acceleration value plotted with respect to the load impact on a per unit basis. The tests are performed on another generator referred to as Generator B. Numerous load impacts are plotted with respect to the rated load of the generator, expressed with 1 pu equal to the rated electrical output of the generator. Once again, the linear relationship between the load and the peak acceleration (or the minimum magnitude) of the operating frequency (in other words, the second derivative of the operating frequency) holds. This relationship is not dependent on a specific model of generator or engine, allowing extrapolation of the algorithm to any generator using certain known parameters. It can also be determined that the slope of the linear curve is smaller for generators having more power and inertia.

Figure 14:
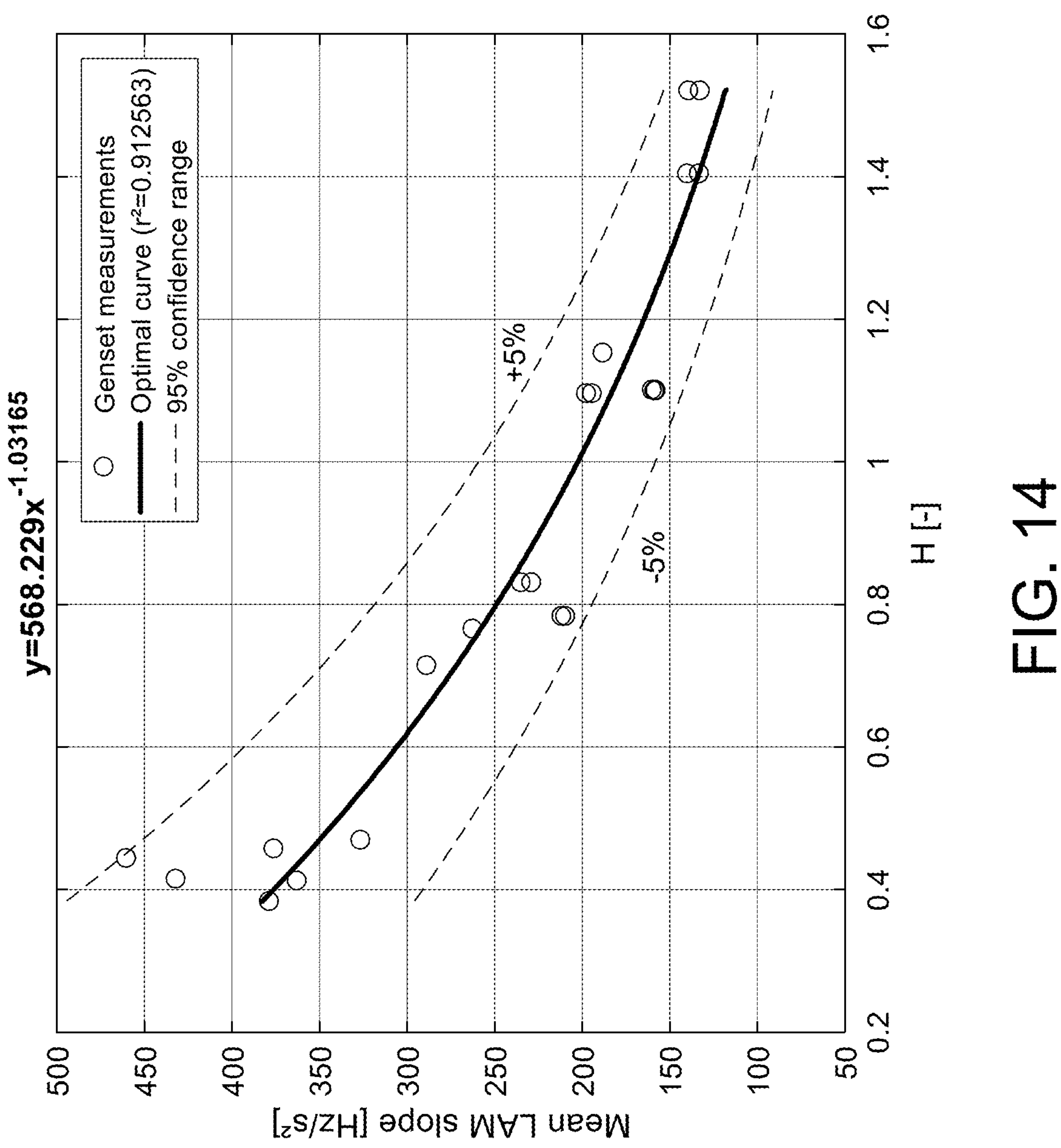
FIG. 14 is a graph illustrating a relationship between generator inertia and peak acceleration.

FIG. 14 illustrates a plurality of tested generators of different models and rated electrical output powers, with each circle representing a tested generator. The graph illustrates the peak acceleration with respect to the inertia. The inertia of the tested generators was determined from published specifications provided by the respective manufacturers. An exponential fit may be applied to the graph, establishing that the relationship between acceleration and inertia can be predicted, allowing the aforementioned extrapolation of the algorithm to all generators.

The generator 10 and voltage regulator 250 operate in three distinct phases to control of the output frequency at the electrical output 221. In a first phase, the load impact is detected using the second derivative of the operating frequency as discussed above. The operating frequency is sampled at the desired frequency, then filtered. The second derivative is taken from the filtered sample data. The resulting second derivative is then monitored for minimum magnitudes which indicate a load impact. The size of the load can then be estimated based on the minimum magnitude, the rated power of the generator 10. The minimum magnitude of the second derivative of the operating frequency can be characterized for load impacts of varying sizes for each generator 10. Alternately, the minimum magnitude can be characterized based on generalized data using the curve of FIG. 14 derived from testing load impacts on a variety of other generators.

It is contemplated that the first phase may operate in a variety of modes. A preset threshold or other detection value may be used based on the computation of the size of the load impact relative to the rated output of the generator. In other implementations, custom values for the minimum magnitude or maximum slope of the second derivative of the operating frequency may be applied if the user wants a different response behavior. In yet other implementations, previous impacts may be saved and the slope of the second derivative or the minimum magnitude may be adjusted to take into account variation in the generator or aging of the generator. The memory could be reset or cleared by a user.

Once the impact has been detected, the excitation system 280 of the voltage regulator 250 may operate with one of three selected priorities. The excitation system 280 may be configured to prioritize low voltage drop, low frequency drop, or a compromise between the two. An interpolation table gives a relationship between the load and the excitation current, and different values for the excitation system 280 are given depending on which setting is used.

For instance, where low frequency drop is selected, the excitation system 280 will allow the field current to decrease to minimize the load on the engine 100. Where low voltage drop is selected, the excitation system 280 will attempt to maintain or increase the field current, but this will result in increased load on the engine 100. A compromise mode will strike a balance between the two, allowing some frequency drop and some voltage drop. In all implementations, the load on the engine 100 will increase, but the relative amount of the load may be varied to optimize certain parameters. Furthermore, the improved detection speed will allow the changes to be implemented more rapidly than is the case with other types of voltage regulators 250. Preferably, the excitation system 280 will operate to drive current in the field windings to a setpoint, rather than controlling voltage. Although the excitation system 280 controls voltage in the field windings during steady state operation, current control allows more rapid response, and is used in the first phase while the operating frequency is still decreasing.

Figure 15:
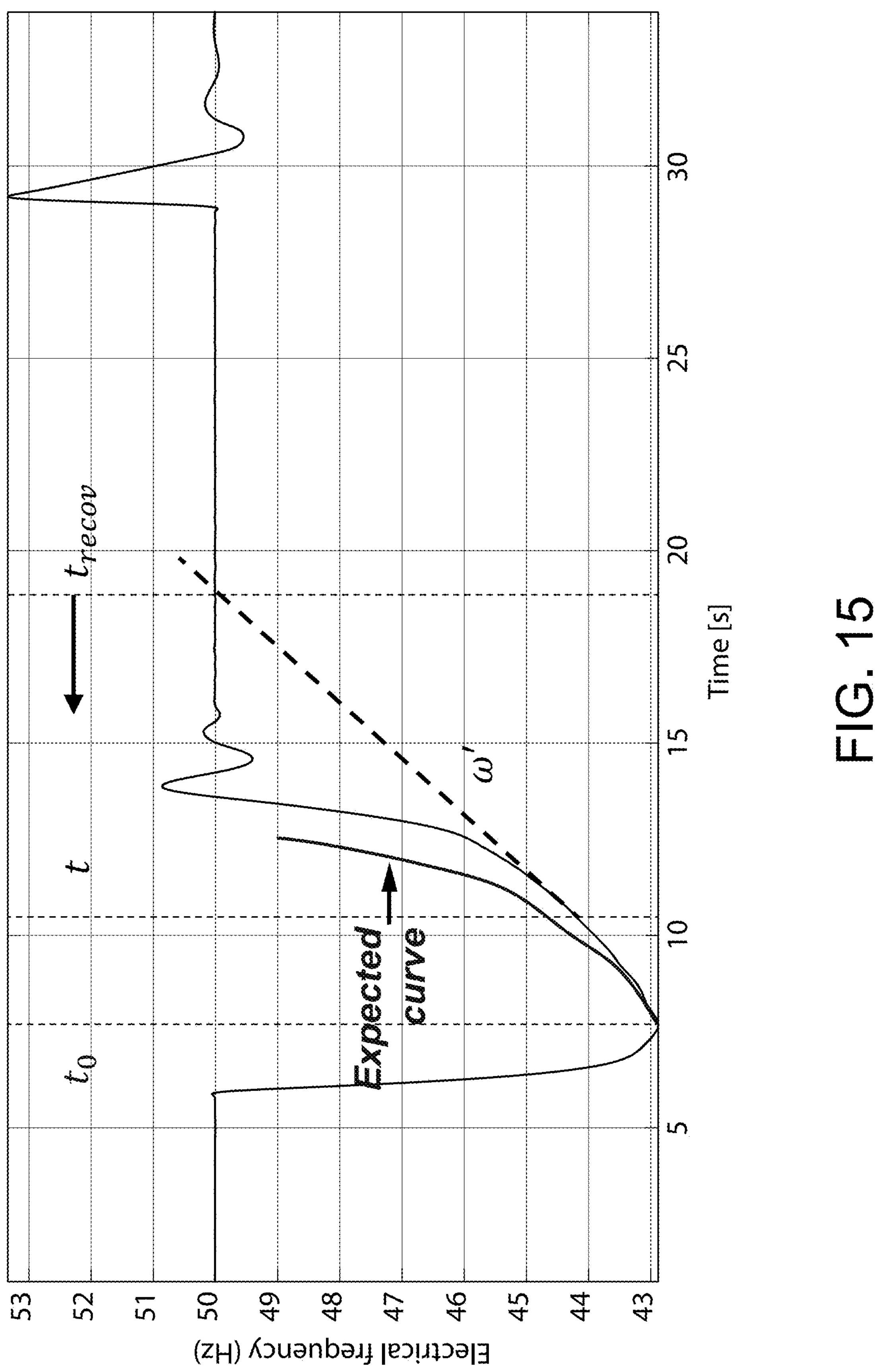
FIG. 15 is a graph illustrating the operating frequency as it recovers from a minimum frequency to a target frequency during a second phase.
Figure 16:
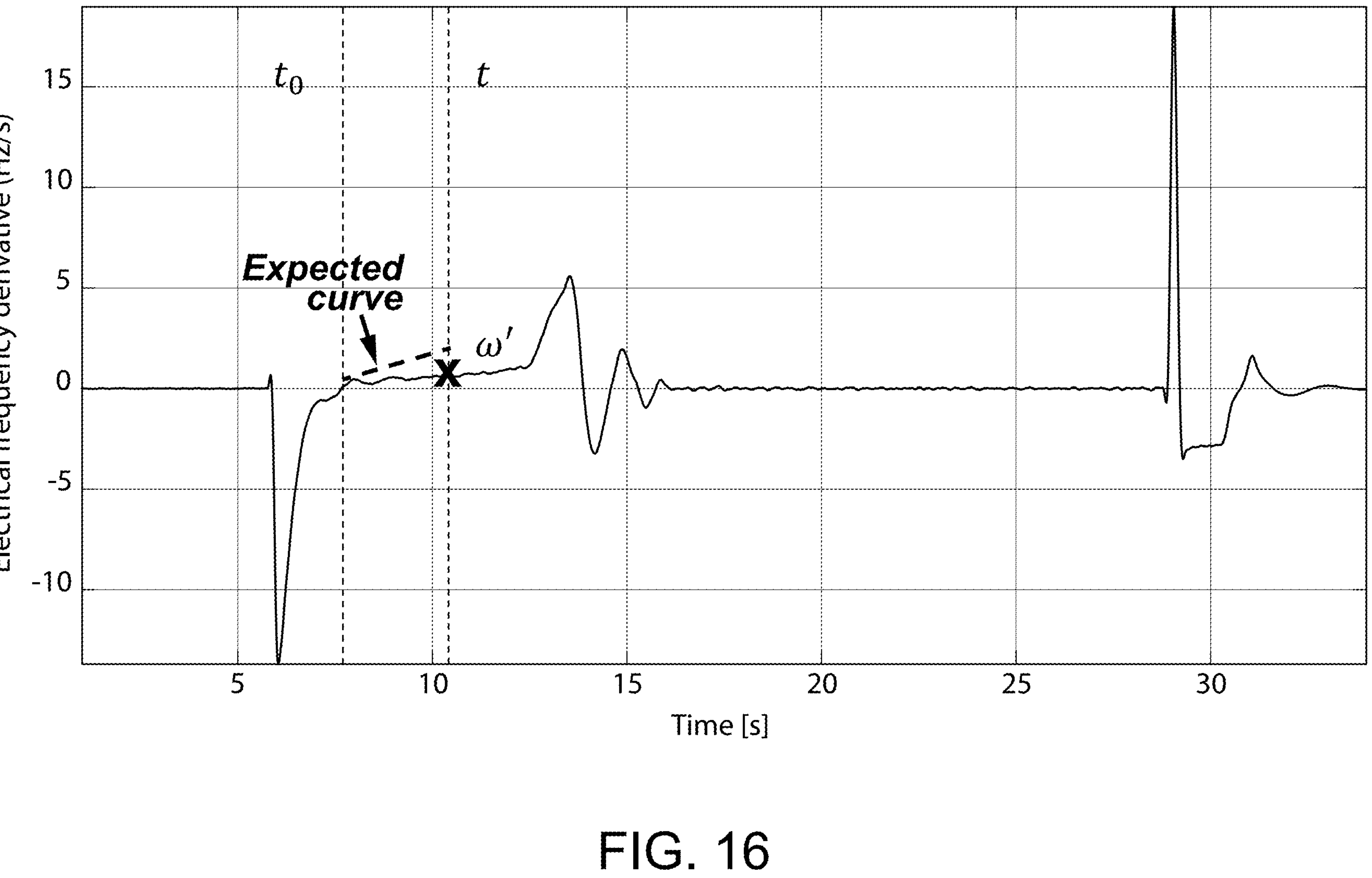
FIG. 16 is a graph illustrating the second derivative of the operating frequency from the minimum frequency to the target frequency during the second phase.

FIG. 15 illustrates the operating frequency at the electrical output 221 during a second phase of control. FIG. 16 illustrates the first derivative of the operating frequency during the second phase. In the second phase, the excitation system 280 attempts to minimize the recovery time $t_{recov}$. This is done by using the instantaneous slope of the operating frequency to estimate the recovery time. The algorithm tries to decrease the recovery time $t_{recov}$ to zero by increasing the excitation voltage. The excitation system 280 no longer controls the current in the field windings, instead switching to a voltage control mode. Subsequent to the increase of the excitation voltage, if the engine 100 accelerates, the excitation voltage is further increased. If the engine decelerates, the excitation voltage is reduced or stabilized. Thus, real time feedback is used to maximize the excitation voltage while ensuring continued acceleration of the engine back to the target frequency.

Figure 17:
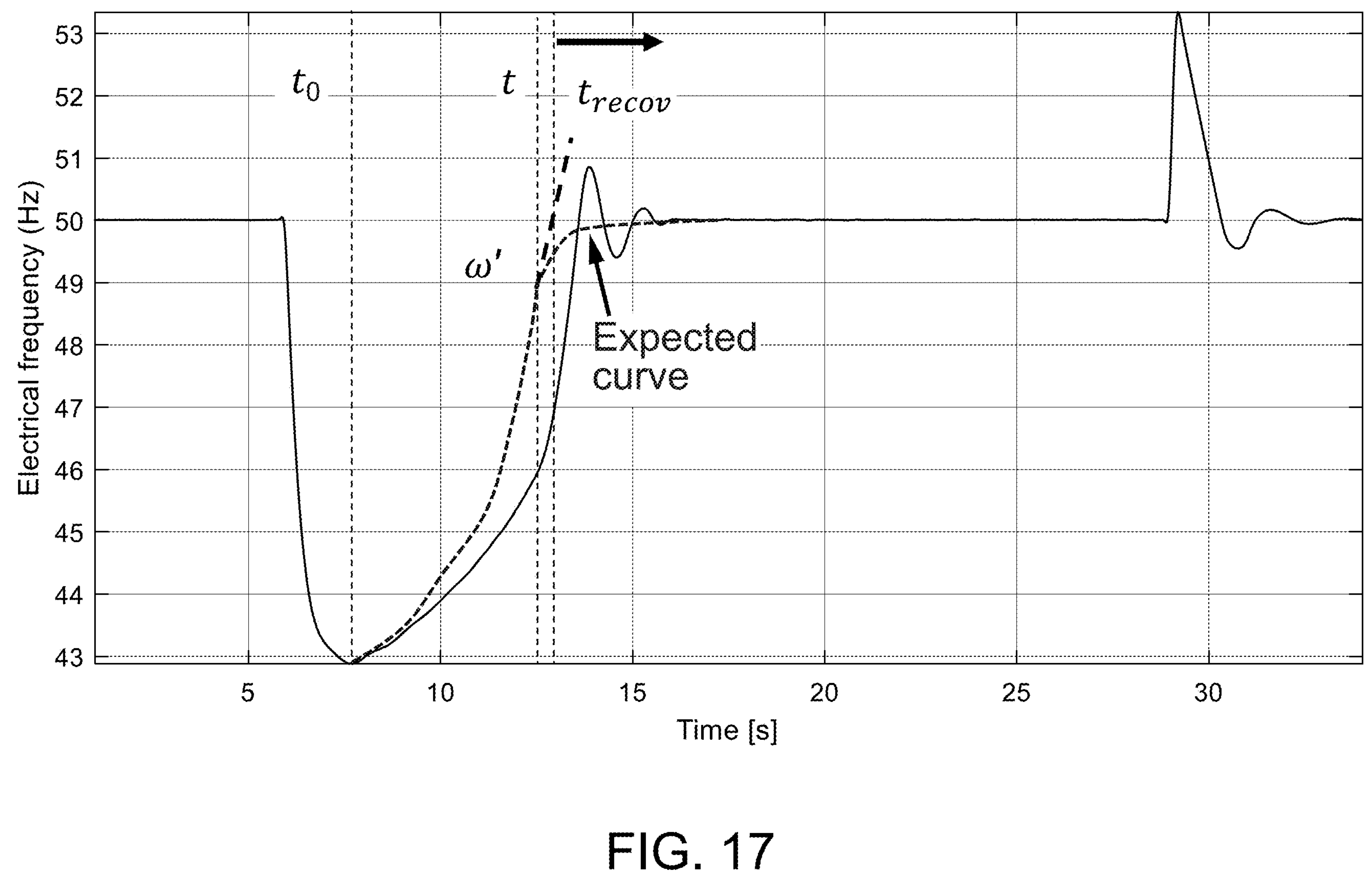
FIG. 17 is a graph illustrating the operating frequency as it recovers from the minimum frequency to the target frequency during a third phase.
Figure 18:
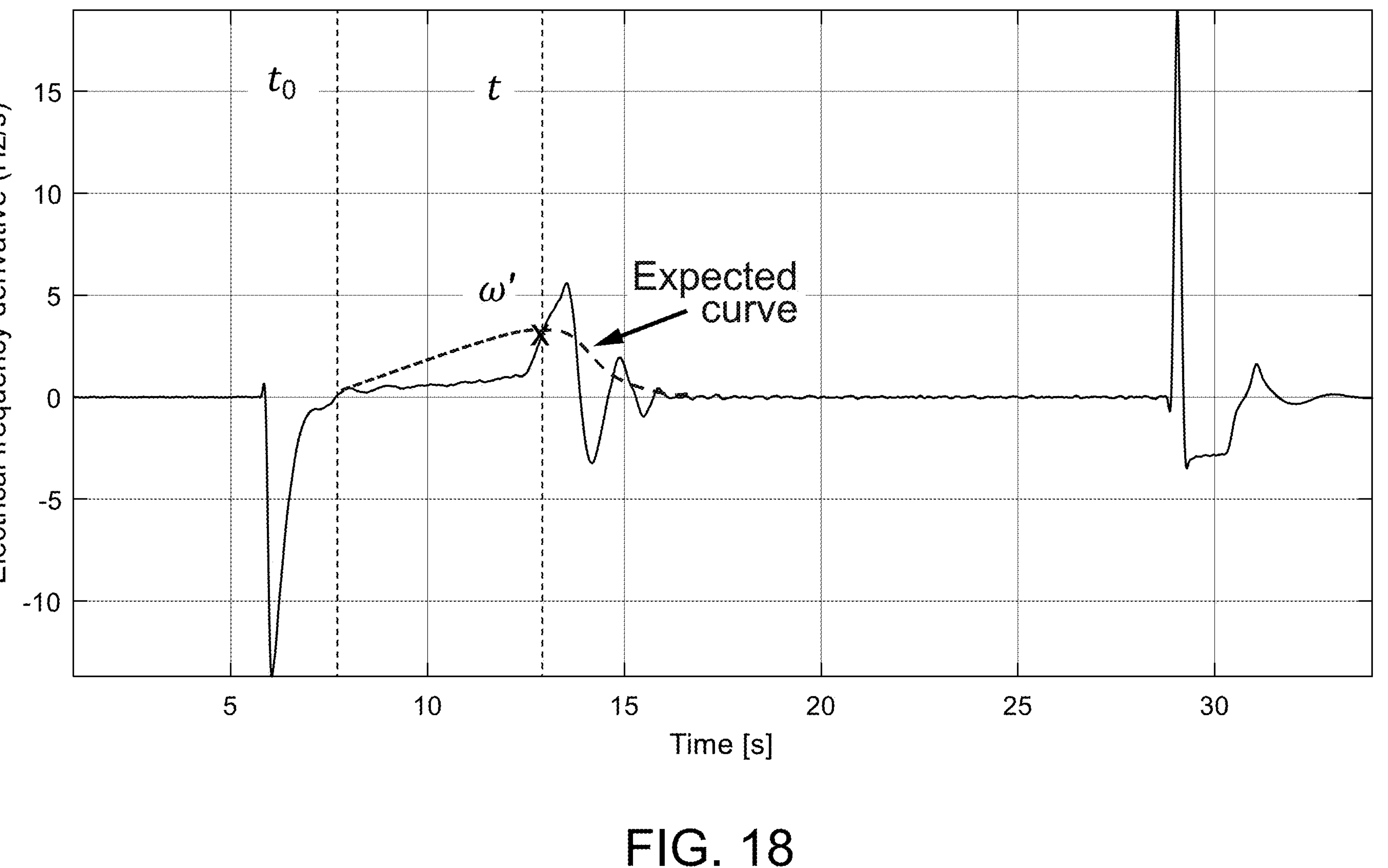
FIG. 18 is a graph illustrating the second derivative of the operating frequency from the minimum frequency to the target frequency during the third phase.

FIG. 17 illustrates the operating frequency at the electrical output 221 during a third phase of control. FIG. 18 illustrates the first derivative of the operating frequency during the third phase. The third phase begins when the remaining recovery time $t_{recov}$ is less than a minimum time, the minimum time being selected based on the response time of the system. The third phase is intended to avoid overshoot oscillations, so the minimum time is the time required to stabilize the operating frequency. During the third phase, the excitation voltage is decreased to avoid overshoot. It is contemplated that the excitation voltage may either be immediately returned to a stored steady state voltage value or the excitation voltage may be progressively decreased until the operating frequency stops accelerating, allowing it to settle at the target frequency.

Figure 19:
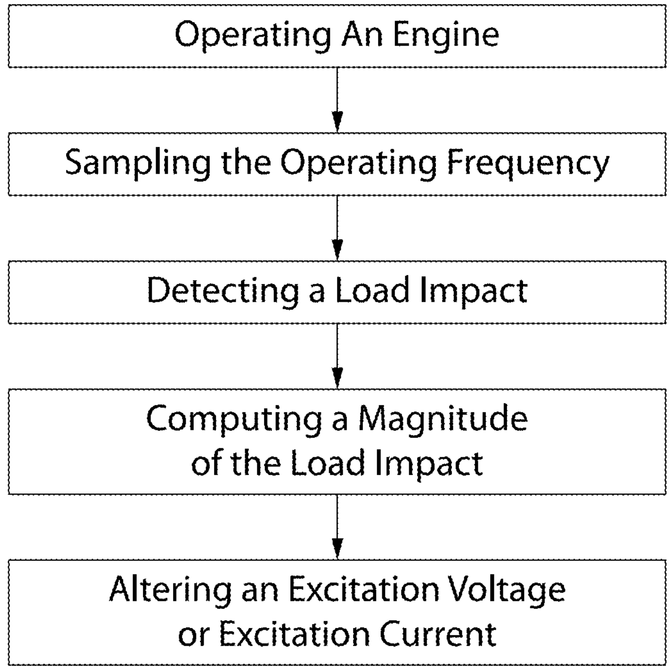
FIG. 19 is a block diagram illustrating a method of operating the generator.

FIG. 19 is a block diagram illustrating a method of operating the generator 10. In a first step, the engine 100 is operated at an operating frequency that is substantially equal to a target frequency. The engine 100 has a crankshaft 110 which forms a portion of a rotating assembly of the generator 10. The engine 100 is operably coupled to an alternator 200, the alternator 200 having a rotor 210 which is coupled to the crankshaft 110, the rotor 210 forming another portion of the rotating assembly of the generator 10. A voltage regulator 250 samples the operating frequency at an electrical output 221 of the alternator 200. A load impact is detected by monitoring either the minimum magnitude or a minimum slope of the second derivative of the operating frequency. Optionally, the load impact may be detected when the minimum magnitude or the minimum slope exceed a threshold.

Subsequent to detection of the load impact, a magnitude of the load impact is computed, the magnitude being a percentage of a rated load of the generator 10. The magnitude of the load impact is calculated using the rated load of the generator 10 and an inertia of the rotating assembly of the generator 10. The magnitude of the load is then used to alter an excitation voltage or excitation current applied to field windings of the alternator 200. In some implementations, the excitation current is altered in a first phase, followed by control of the excitation voltage in second and third phases.

Exemplary Claim Set

Exemplary claim 1. An engine powered generator comprising: an internal combustion engine comprising a crankshaft; an alternator comprising a rotor operably coupled to the crankshaft, the alternator configured to deliver electrical power at an electrical output; and a voltage regulator configured to regulate an excitation voltage applied to a field winding of the alternator, the voltage regulator comprising: a sampling system which samples an operating frequency of an alternating current at the electrical output; a detection system configured to compute a second derivative of the operating frequency; and an excitation system configured to alter one of the excitation voltage or an excitation current in response to the second derivative of the operating frequency indicating a load impact.

Exemplary claim 2. The engine powered generator of exemplary claim 1 wherein the second derivative of the operating frequency indicates the load impact when a magnitude or a slope of the second derivative of the operating frequency exceeds a threshold.

Exemplary claim 3. The engine powered generator of exemplary claim 1 or exemplary claim 2 wherein the voltage regulator detects a magnitude of the load impact using, at least in part, the inertia of a rotating assembly of the generator and a rated power output of the generator, the rotating assembly comprising the crankshaft and the rotor of the alternator.

Exemplary claim 4. The engine powered generator of any one of exemplary claims 1 to 3 wherein the engine powered generator comprises an engine controller, the voltage regulator communicating no information to the engine controller.

Exemplary claim 5. The engine powered generator of any one of exemplary claims 1 to 4 wherein, in response to the second derivative of the operating frequency indicating the load impact, the sampling system monitors a first derivative of the operating frequency and alters the excitation voltage to minimize a recovery time of the operating frequency from a minimum frequency to a target frequency.

Exemplary claim 6. The engine powered generator of any one of exemplary claims 1 to 5 wherein the excitation system is configured to prioritize low voltage drop at the electrical output.

Exemplary claim 7. The engine powered generator of any one of exemplary claims 1 to 5 wherein the excitation system is configured to prioritize low frequency drop at the electrical output.

Exemplary claim 8. The engine powered generator of any one of exemplary claims 1 to 5 wherein the excitation system is configured to balance low frequency drop and low voltage drop at the electrical output.

Exemplary claim 9. The engine powered generator of any one of exemplary claims 1 to 8 wherein the excitation system controls the excitation current in response to the second derivative of the operating frequency indicating a load impact.

Exemplary claim 10. The engine powered generator of exemplary claim 9 wherein the excitation system controls the excitation voltage once the operating frequency reaching a minimum value.

Exemplary claim 11. A method of operating a generator comprising: a) operating an engine of the generator at an operating frequency; b) sampling the operating frequency and computing a second derivative of the operating frequency; c) detecting a load impact when the second derivative of the operating frequency has a magnitude or a slope exceeding a threshold; d) altering an excitation current or an excitation voltage of an alternator of the generator in response to the detected load impact.

Exemplary claim 12. The method of exemplary claim 11 wherein the magnitude or the slope is greater than a value of the second derivative of the operating frequency during steady state operation of the generator.

Exemplary claim 13. The method of exemplary claim 11 or exemplary claim 12 wherein, in step c), the voltage regulator detects the magnitude of the load impact using, at least in part, the inertia of a rotating assembly of the generator and a rated power output of the generator.

Exemplary claim 14. The method of any one of exemplary claims 11 to 13 wherein, in step d), the excitation current is decreased in response to the detected load impact.

Exemplary claim 15. The method of exemplary claim 14 further comprising step e) subsequent to step d), step e) comprising sampling a first derivative of the operating frequency and altering the excitation voltage to minimize a recovery time of the operating frequency from a minimum frequency to a target frequency.

Exemplary claim 16. The method of exemplary claim 15 further comprising step f) subsequent to step e), step f) comprising reducing an excitation voltage at an advance time prior to the recovery time.

Exemplary claim 17. The method of any one of exemplary claims 11 to 16 wherein, in step b), the operating frequency is sampled at a frequency selected to substantially minimize a reaction time between the load impact and the detection of the load impact.

Exemplary claim 18. A method of operating a generator comprising: a) operating an engine of the generator at an operating frequency; b) sampling the operating frequency to detect a load impact; c) computing a magnitude of the load impact using, at least in part, the operating frequency, an inertia of a rotating assembly of the generator, and a rated power output of the generator; and d) altering an excitation voltage or an excitation current of an alternator of the generator in response to the magnitude of the load impact.

Exemplary claim 19. The method of exemplary claim 18 wherein, in step d), the alteration of the excitation voltage or the excitation current corresponds to the magnitude of the load impact.

Exemplary claim 20. The method of exemplary claim 18 or exemplary claim 19 wherein, in step d), the excitation current is controlled until the operating frequency reaches a minimum frequency and the excitation voltage is controlled subsequent to the operating frequency reaching the minimum frequency.

While the foregoing description and drawings represent examples of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed examples are therefore to be considered in all respects as illustrative and not restrictive, the scope of the invention being defined by the appended claims and equivalents thereof, and not limited to the foregoing description or examples. Rather, the appended claims should be construed broadly, to include other variants of the invention, which may be made by those skilled in the art without departing from the scope and range of equivalents of the invention.

What is claimed is:

1. An engine powered generator comprising:

an internal combustion engine comprising a crankshaft;

an alternator comprising a rotor operably coupled to the crankshaft, the alternator configured to deliver electrical power at an electrical output; and a voltage regulator configured to regulate an excitation voltage applied to a field winding of the alternator, the voltage regulator comprising:

a sampling system which samples an operating frequency of an alternating current at the electrical output;

a detection system configured to compute a second derivative of the operating frequency; and an excitation system configured to alter one of the excitation voltage or an excitation current in response to the second derivative of the operating frequency indicating a load impact, the second derivative of the operating frequency indicating the load impact when a magnitude or a slope of the second derivative of the operating frequency exceeds a threshold.

2. The engine powered generator of claim 1 wherein the voltage regulator detects a magnitude of the load impact using, at least in part, the inertia of a rotating assembly of the generator and a rated power output of the generator, the rotating assembly comprising the crankshaft and the rotor of the alternator.

3. The engine powered generator of claim 1 wherein the engine powered generator comprises an engine controller, the voltage regulator communicating no information to the engine controller.

4. The engine powered generator of claim 1 wherein, in response to the second derivative of the operating frequency indicating the load impact, the sampling system monitors a first derivative of the operating frequency and alters the excitation voltage to minimize a recovery time of the operating frequency from a minimum frequency to a target frequency.

5. The engine powered generator of claim 1 wherein the excitation system is configured to prioritize low voltage drop at the electrical output.

6. The engine powered generator of claim 1 wherein the excitation system is configured to prioritize low frequency drop at the electrical output.

7. The engine powered generator of claim 1 wherein the excitation system is configured to balance low frequency drop and low voltage drop at the electrical output.

8. The engine powered generator of claim 1 wherein the excitation system controls the excitation current in response to the second derivative of the operating frequency indicating a load impact.

9. The engine powered generator of claim 8 wherein the excitation system controls the excitation voltage once the operating frequency reaching a minimum value.

10. A method of operating a generator comprising:

a) operating an engine of the generator at an operating frequency;

b) sampling the operating frequency and computing a second derivative of the operating frequency;

c) detecting a load impact when the second derivative of the operating frequency has a magnitude or a slope exceeding a threshold, the second derivative of the operating frequency indicating the load impact when the magnitude or the slope of the second derivative of the operating frequency exceeds the threshold;

d) altering an excitation current or an excitation voltage of an alternator of the generator in response to the detected load impact.

11. The method of claim 10 wherein the magnitude or the slope is greater than a value of the second derivative of the operating frequency during steady state operation of the generator.

12. The method of claim 10 wherein, in step c), the voltage regulator detects the magnitude of the load impact using, at least in part, the inertia of a rotating assembly of the generator and a rated power output of the generator.

13. The method of claim 10 wherein, in step d), the excitation current is decreased in response to the detected load impact.

14. The method of claim 13 further comprising step e) subsequent to step d), step e) comprising sampling a first derivative of the operating frequency and altering the excitation voltage to minimize a recovery time of the operating frequency from a minimum frequency to a target frequency.

15. The method of claim 14 further comprising step f) subsequent to step e), step f) comprising reducing an excitation voltage at an advance time prior to the recovery time.

16. The method of claim 10 wherein, in step b), the operating frequency is sampled at a frequency selected to substantially minimize a reaction time between the load impact and the detection of the load impact.

17. A method of operating a generator comprising:

a) operating an engine of the generator at an operating frequency;

b) sampling the operating frequency and computing a second derivative of the operating frequency;

c) detecting a load impact when the second derivative of the operating frequency has a magnitude or a slope exceeding a threshold, the second derivative of the operating frequency indicating the load impact when the magnitude or the slope of the second derivative of the operating frequency exceeds the threshold;

d) computing a magnitude of the load impact using, at least in part, the operating frequency, an inertia of a rotating assembly of the generator, and a rated power output of the generator; and e) altering an excitation voltage or an excitation current of an alternator of the generator in response to the magnitude of the load impact.

18. The method of claim 17 wherein, in step e), the alteration of the excitation voltage or the excitation current corresponds to the magnitude of the load impact.

19. The method of claim 17 wherein, in step e), the excitation current is controlled until the operating frequency reaches a minimum frequency and the excitation voltage is controlled subsequent to the operating frequency reaching the minimum frequency.

* * * * *